(12) United States Patent
Kim

(10) Patent No.: US 11,927,682 B2
(45) Date of Patent: Mar. 12, 2024

(54) SOUND SOURCE VISUALIZATION DEVICE AND METHOD

(71) Applicant: Young Eon Kim, Cupertino, CA (US)

(72) Inventor: Young Eon Kim, Cupertino, CA (US)

( * ) Notice: Subject to any disclaimer, the term of this patent is extended or adjusted under 35 U.S.C. 154(b) by 96 days.

(21) Appl. No.: 17/623,843

(22) PCT Filed: Jun. 10, 2020

(86) PCT No.: PCT/KR2020/007503
§ 371 (c)(1),
(2) Date: Dec. 29, 2021

(87) PCT Pub. No.: WO2021/006491
PCT Pub. Date: Jan. 14, 2021

(65) Prior Publication Data
US 2022/0357417 A1 Nov. 10, 2022

(30) Foreign Application Priority Data

Jul. 10, 2019 (KR) .......................... 10-2019-0083252

(51) Int. Cl.
*G01S 3/802* (2006.01)
*G01S 5/22* (2006.01)
*G01S 11/14* (2006.01)

(52) U.S. Cl.
CPC ................ *G01S 3/802* (2013.01); *G01S 5/22* (2013.01); *G01S 11/14* (2013.01); *G01S 2205/06* (2020.05)

(58) Field of Classification Search
CPC . G01S 3/802; G01S 5/22; G01S 11/14; G01S 2205/06
See application file for complete search history.

(56) References Cited

U.S. PATENT DOCUMENTS 4,208,735 A * 6/1980 Suzuki .................... G01S 11/14
367/136
10,088,868 B1 * 10/2018 Hernandez Garcia .. G06F 3/011
(Continued)

FOREIGN PATENT DOCUMENTS

JP  2015-050610 A  3/2015
JP  2016-212312 A  12/2016
(Continued)

OTHER PUBLICATIONS

Ding H, Bao Y, Huang Q, Li C, Chai G. 2018 Three-dimensional localization of point acoustic sources using a planar microphone array combined with beamforming. R. Soc. open sci. 5: 181407. http://dx.doi.org/10.1098/rsos.181407 (Year: 2018).*
(Continued)

*Primary Examiner* — Isam A Alsomiri
*Assistant Examiner* — Joseph C Fritchman
(74) *Attorney, Agent, or Firm* — Stein IP, LLC

(57) ABSTRACT

There are provided a sound source visualization device and method. A sound source visualization device according to an embodiment includes: a sound source detection module configured to detect a sound source signal by using a plurality of sound source detection sensors; a preprocessing module configured to filter out the noise and amplify the sound source signal; a calculation module configured to calculate an approximate sound source location by analyzing the preprocessed sound source signal; a search module configured to generate a plurality of pseudo-planes by using the altitude information, to select planes, and to generate three-dimensional sound source location and altitude information by including information, obtained using the selected planes, in the approximate sound source location; and a visualization module configured to output sound source information to a preset system host or to convert this sound (Continued)

(A)

(B)

source information into a visualization signal and display the visualized signal.

9 Claims, 6 Drawing Sheets

(56) References Cited

U.S. PATENT DOCUMENTS

| | | | | |
|---|---|---|---|---|
| 2016/0103202 | A1* | 4/2016 | Sumiyoshi | G01S 5/18 367/118 |
| 2018/0114445 | A1* | 4/2018 | Jang | G01S 3/801 |
| 2018/0266999 | A1* | 9/2018 | Usui | G01N 29/42 |
| 2018/0314488 | A1 | 11/2018 | Hayasaka | |

FOREIGN PATENT DOCUMENTS

| KR | 10-2010-0039613 A | 4/2010 |
|---|---|---|
| KR | 10-1445367 B1 | 10/2014 |
| KR | 10-2018-0039409 A | 4/2018 |
| KR | 10-2018-0045610 A | 5/2018 |

OTHER PUBLICATIONS

International Search Report dated Sep. 14, 2020, issued to International Application No. PCT/KR2020/007503.

\* cited by examiner

SOUND SOURCE VISUALIZATION DEVICE AND METHOD

CROSS-REFERENCE TO RELATED APPLICATIONS

This application is a national stage of International Application No. PCT/KR2020/007503, filed Jun. 10, 2020, which claims the benefit of Korean Application No. 10-2019-0083252, filed Jul. 10, 2019, in the Korean Intellectual Property Office, the disclosure of which is incorporated herein by reference.

TECHNICAL FIELD

The present invention relates to a sound source visualization device and method, and more particularly to a sound source visualization device and method that determine sound source information such as the location, altitude, direction, intensity, and separation distance of a sound source via a plurality of sound source detection sensors and then allows a user to intuitively recognize the location, altitude, intensity, and separation distance of the sound source visually.

BACKGROUND ART

Unless otherwise indicated herein, the items to be described in this section do not correspond to prior art to the claims of the present application, and the inclusion of items in this section is not an admission that they correspond to prior art.

An autonomous vehicle is a vehicle that drives itself without a driver operating a steering wheel, a brake, a pedal, etc., which is a vehicle that detects surrounding situations through sensors, avoids obstacles, selects an optimal traveling route to a destination, and drives automatically. Such autonomous vehicles are essentially equipped with a highway driving assistance system, a lane departure warning system, a lane-keeping assistance system, a rear side warning system, an advanced smart cruise control designed to keep the distance between vehicles constant, and an automatic emergency braking system. Autonomous vehicles are the core of future automobile technology, and correspond to the field of technology actively being researched and developed by multinational companies such as Google.

The technological development stages of autonomous vehicles are usually classified into level 0 to level 5. Level 0 of autonomous vehicle technology is a stage in which there is no technology related to autonomous driving, and level 1 is a stage that still requires driver intervention during driving. Level 2 is a stage in which a vehicle can turn a steering wheel on its own and perform acceleration and deceleration driving, and level 3 is a stage in which a vehicle can avoid obstacles on a road. From level 3, the monitoring standards for driving are transferred from a human to a system. From level 3, monitoring standards are changed, so that a driver's attention is considerably reduced. Level 4 is a technology level that responds to various road conditions and driving situations, and level 5 is a technology level that realizes complete autonomous driving that eliminates the need for the issuance of a driver's license. Currently, autonomous vehicles having technology levels of level 3 and level 4 are being marketed.

The processes of recognizing obstacles and objects around a vehicle in conventional autonomous vehicle and unmanned vehicle technology currently having level 3 are mostly designed to visually recognize an object through a sensor such as a camera. However, in a process in which an actual human drives a vehicle, there are frequent cases where objects around the vehicle are recognized through sound and emergency situations are determined through sound. For example, an emergency signal such as an object sound, a crash sound, an impact sound, or a siren sound is a sound source that a driver must consider as important.

However, conventionally, the development of technology has been concentrated on technologies that use a visual signal when judging a driving situation. In the future, in order to realize technology for fully autonomous driving similar to human driving in level 5, sound signal processing and visualization technology for autonomous driving vehicles is demanded.

DISCLOSURE

Technical Problem

There is provided a sound source visualization device and method that may recognize various types of sound source information such as the direction, location, altitude, intensity, and separation distance of a sound source using a plurality of sound source detection sensors and visualizes the sound source information so that a user can intuitively and rapidly become aware of the location of the sound source.

Furthermore, the altitude of a sound source is included in approximate sound source location information including the direction, intensity, and location of the sound source or sound source altitude information and location information are corrected, so that a user is allowed to recognize the location of the nearby sound source in a three-dimension form including the altitude information of the sound source.

Moreover, all sound source information such as the movement direction, movement, and intensity of a sound source is visualized such that the intensity and risk of the sound source can be more intuitively determined.

Technical Solution

A sound source visualization device according to an embodiment includes: a sound source detection module configured to detect sound source signals, including a surrounding sound, sound sources, and noise, by using a plurality of sound source detection sensors; a preprocessing module configured to filter out the noise from the detected sound source signal, and to amplify the sound source signal; a calculation module configured to calculate an approximate sound source location, including a separation distance from the sound source visualization device, direction, sound source intensity, two-dimensional position, and altitude information of the sound source, by analyzing the preprocessed sound source signal; a search module configured to generate a plurality of pseudo-planes, including altitude information of the sound source detected by the individual sound source detection sensors, by using the altitude information, to select planes from among the plurality of planes, and to generate three-dimensional sound source location and altitude information by including information, obtained using the selected planes, in the approximate sound source location; and a visualization module configured to output sound source information, including the three-dimensional sound source location information, sound source altitude information, and sound source intensity information, to a preset system host or to convert this sound source information into a visualization signal and display the visualized signal.

A sound source visualization method according to another embodiment includes the steps of: (A) detecting, by a sound source detection module, a sound source signal, including a surrounding sound, a sound source, and noise, by using a plurality of sound source detection sensors; (B) filtering out, by a preprocessing module, the noise from the detected sound source signal, and amplifying, by the preprocessing module, the sound source signal; (C) calculating, by a calculation module, an approximate sound source location, including a separation distance from the sound source visualization device, direction, sound source intensity, two-dimensional position, and altitude information of the sound source, by analyzing the preprocessed sound source signal; (D) generating, by a search module, a plurality of pseudo-planes, including altitude information altitude information of the sound source detected by the individual sound source detection sensors by using the altitude information, selecting, by the search module, planes from among the plurality of planes, and generating, by the search module, three-dimensional sound source location information by including information, obtained using the selected planes, in the approximate sound source location; and (E) converting, by a visualization module, sound source information, including the three-dimensional sound source location information, sound source altitude information, and sound source intensity information, into a visualization signal, and displaying, by the visualization module, the visualized signal.

Advantageous Effects

The above-described sound source visualization device and method allow various types of sound source information including the altitude, direction, distance to a user and location, and intensity of a sound source to be determined, thereby enabling whether an object is present around a user and a danger signal to be more accurately determined through the sound source.

Furthermore, in an autonomous vehicle, a nearby sound signal is converted into a visual form and then sound information is provided to a system or a driver as visual information, so that the system or the driver can become aware of an emergency situation caused by the movement of a nearby object or a nearby sound that cannot be visually recognized or cannot be recognized with a camera.

Furthermore, pseudo planes representing the locations of a sound source in three dimensions for respective sound source detection sensors are generated and sound source altitude information is corrected through the planar matching between the planes, so that even the sound source altitude information can be accurately provided to a user even when a sound source is not present on a plane.

Furthermore, when the sound source visualization device according to the embodiment is provided to a user and the elderly with weak hearing, those with weak hearing may visually recognize a sound source signal.

Moreover, when the sound source visualization device according to the embodiment is installed in an exercise assistance apparatus for the elderly, safety-related accidents may be prevented by enabling elderly people with relatively weak hearing to visually recognize auditory information.

The effects of the present invention are not limited to the above-described effects, and it should be understood that the effects of the present invention include all effects that can be inferred from the configuration of the invention described in the detailed description of the present invention or the claims.

BEST MODE

Figure 1:
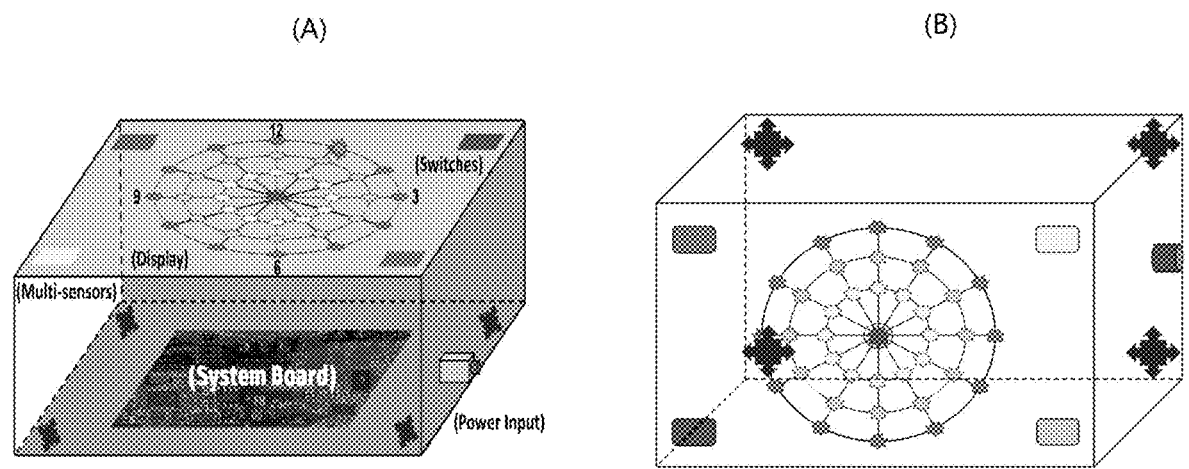
FIG. 1 is a view showing a sound source visualization device according to an embodiment.

A sound source visualization device according to an embodiment includes: a sound source detection module configured to detect a sound source signal, including a surrounding sound, a sound source, and noise, by using a plurality of sound source detection sensors diagonally installed at different heights; a preprocessing module configured to filter out the noise from the detected sound source signal, and to amplify the sound source signal; a calculation module configured to calculate an approximate sound source location, including a separation distance from the sound source visualization device, direction, sound source intensity, two-dimensional position, and altitude information of the sound source, by analyzing the preprocessed sound source signal; a search module configured to generate a plurality of pseudo-planes, including altitude information of the sound source detected by the individual sound source detection sensors, by using the altitude information, to select planes from among the plurality of planes, and to generate three-dimensional sound source location information by including the altitude information, obtained using the selected planes, in the approximate sound source location; and a visualization module configured to output sound source information, including the three-dimensional sound source location information, sound source altitude information, and sound source intensity information, to a preset system host or to convert this sound source information into a visualization signal and display the visualized signal.

MODE FOR INVENTION

The advantages and features of the present invention and methods for achieving them will become apparent with reference to the embodiments that will be described below in detail in conjunction with the accompanying drawings. However, the present invention is not limited to the embodiments to be disclosed below, but may be implemented in various different forms. The present embodiments are provided only to make the disclosure of the present invention complete and to fully convey the scope of the invention to those of ordinary skill in the art to which the present invention pertains. The invention is only defined based on the scope of the claims. Like reference numerals denote like elements throughout the specification.

In the description of the embodiments of the present invention, when it is determined that a detailed description of a well-known function or configuration may unnecessarily make the gist of the present invention obscure, the detailed description will be omitted. Furthermore, the terms to be described later are terms defined by taking into consideration the functions thereof in a corresponding embodiment of the present invention, and may vary according to the intention of a user or an operator or custom. Therefore, the definitions of the terms should be made based on the context throughout the present specification.

FIG. 1 is a view showing a sound source visualization device according to an embodiment.

Referring to FIG. 1, the sound source visualization device according to the embodiment recognizes sound source information, including the intensity, location, direction, and altitude of a sound source, around a user, converts the sound source information into a visualization object, and displays them to the user. Although a clock-shaped radial visualization template (a) is proposed in the embodiment, the sound source visualization template is not limited to the example shown in FIG. 1. In an embodiment, in the case of the sound source detected by the plurality of sound source detection sensors, individual items of the sound source information, such as the intensity, the direction, and the distance between the user and the sound source, are converted into a visualization object corresponding to the sound source visualization template, so that even detailed sound source information can be visually provided to the user. As shown in FIG. 1, the visualization template for the sound source information may be displayed on the top surface (A) or side surface (B) of the sound source visualization device.

The sound source visualization device according to the embodiment may be applied to various systems and apparatuses such as an autonomous vehicle. In this case, the sound source visualization device may display sound source information using a visualization template preset in the system.

Figure 2:
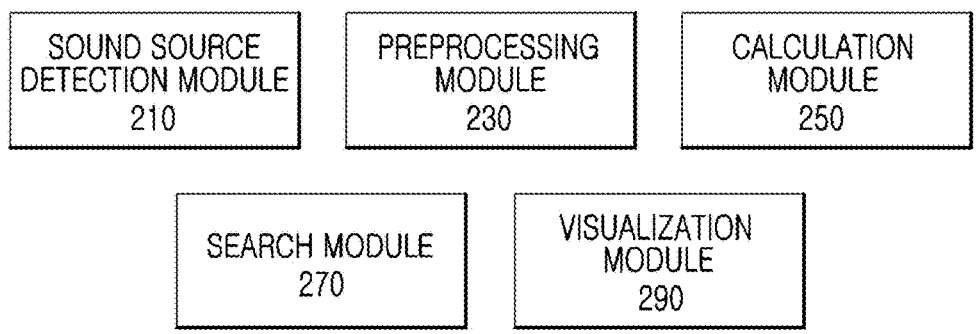
FIG. 2 is a diagram showing data processing blocks of a sound source visualization device according to an embodiment.

FIG. 2 is a diagram showing data processing blocks of a sound source visualization device according to an embodiment.

Referring to FIG. 2, the sound source visualization device according to the embodiment may be configured to include a sound source detection module 210, a preprocessing module 230, a calculation module 250, a search module 270, and a visualization module 290. The term 'module' used herein should be construed to include software, hardware, or a combination thereof depending on the context in which the term is used. For example, the software may be machine language, firmware, embedded code, and application software. As another example, the hardware may be a circuit, a processor, a computer, an integrated circuit, an integrated circuit core, a sensor, a Micro-Electro-Mechanical System (MEMS), a passive device, or a combination thereof.

The sound source detection module 210 detects a sound source signal, including a surrounding sound, a sound source, and noise, by a plurality of sound source detection sensors diagonally installed at the same height or different heights. In the embodiment, four sound source detection sensors may detect a surrounding sound, a sound source, and noise.

The preprocessing module 230 filters out noise from the detected sound source signal, and amplifies the sound source signal. For example, the preprocessing module 230 may filter out a noise signal by identifying the frequency and intensity of the sound source collected through the sensor, and may amplify the main sound source signal to a predetermined decibel or level or higher.

The calculation module 250 calculates an approximate sound source location including the separation distance, direction, sound source intensity, two-dimensional location, and approximate altitude information of the sound source by analyzing the preprocessed sound source signal. In the embodiment, the approximate sound source location is obtained by primarily calculating sound source information, including the relative location, size, sound source altitude, etc. of the sound source, at a user's location through the sound source signal received from the preprocessing module 230.

The search module 270 generates a plurality of pseudo-planes using the altitude information of the sound source detected by the individual sound source detection sensors, selects planes from among the plurality of planes, and includes the altitude information, obtained using the selected planes, in the approximate sound source location, thereby generating three-dimensional (3D) sound source location information. In an embodiment, the search module 270 corrects the sound source altitude information and the sound source location information primarily calculated by the calculation module 250. More specifically, the search module 270 may generate pseudo-planes including the location coordinates (x, y) of the sound source and the altitude coordinate (z) of the sound source by using the sound source information detected by the individual sensors, may select some planes from among the pseudo-planes generated by the individual sensors, and may correct the altitude information of the sound source. In the embodiment, in the planes generated by the individual sensors, the sound source altitude information may be corrected using the average value, median value, mode, or simulation of the z-coordinates, which are the sound source altitude information. In an embodiment, the corrected information may be generated as the sound source altitude information.

Figure 3:
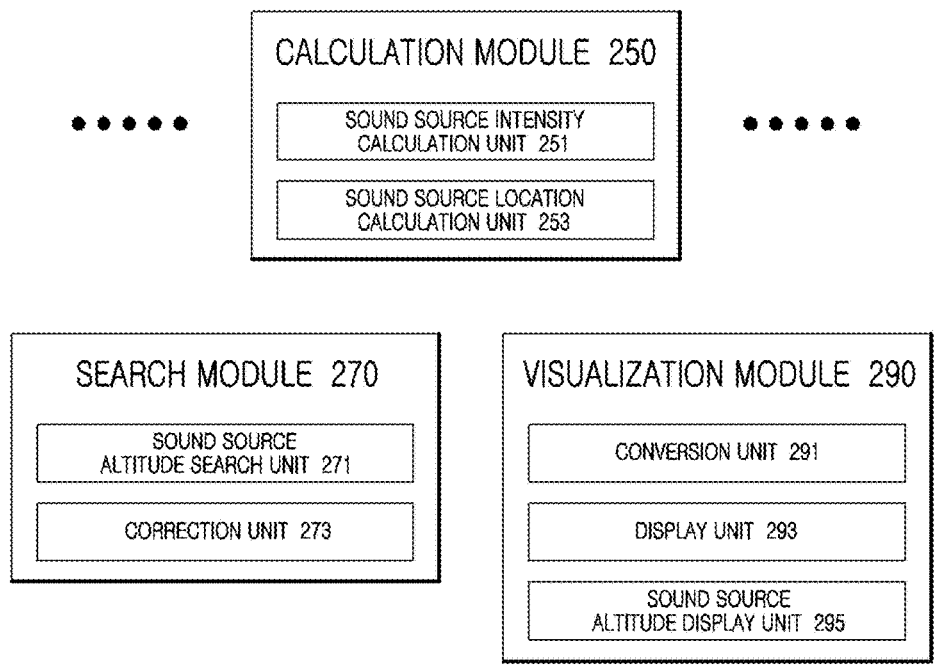
FIG. 3 is a diagram showing detailed data processing blocks of a sound source visualization device according to an embodiment.

The visualization module 290 outputs sound source information, including 3D sound source location information, sound source altitude information, and sound source intensity information, to a system host, or converts the sound source information into visualization signals and a visualization object corresponding to a visualization template and displays the visualized signals and the visualized object FIG. 3 is a diagram showing detailed data processing blocks of a sound source visualization device according to an embodiment.

Referring to FIG. 3, the calculation module 250 according to the embodiment may be configured to include a sound source intensity calculation unit 251 and a sound source location calculation unit 253, the search module 270 may be configured to include a sound source altitude search unit 271 and a correction unit 273, and the visualization module 290 may be configured to include a conversion unit 291, a display unit 293, and a sound source altitude display unit 295.

The sound source intensity calculation unit 251 of the calculation module 250 determines the sound source data and the intensity of the sound source signal recognized by the sound source detection sensors, and calculates the sound source intensity level corresponding to the determined intensity. For example, the sound source intensity calculation unit 251 determines the sound source intensity and calculates a sound source intensity level corresponding to the determined sound source intensity. More specifically, the sound intensity level may be calculated such that 0-50 decibels correspond to level 1, 51-100 decibels correspond to level 2, and 101-150 decibels corresponds to level 3, and the ranges and intervals of sound intensity levels may be adjusted during system design. The individual sound source levels set in the embodiment may be matched with colors, brightness levels (lux) of light, and/or flickering frequencies, and thus the intensities of the sound source may be visually displayed.

The sound source location calculation unit 253 calculates the location at which the sound source was generated and the location to which the sound source has been moved by analyzing the sound source signal obtained by processing the sound source detection signals, detected by the respective sound source detection sensors, in the preprocessing module.

The sound source altitude search unit 271 of the search module 270 generates planes, representing the altitude information of the sound source recognized by the individual sound source detection sensors, by using the calculated sound source location information and the altitude data of the sound source included in the sound source information detected by the individual sound source detection sensors, and determines the altitude of the sound source by extracting information from the generated planes.

The correction unit 273 adds the found sound source altitude information to the approximate sound source location information, or corrects the generated sound source location, sound source distance, intensity, and sound source altitude.

The conversion unit 291 of the visualization module 290 converts the direction of the sound source and the separation distance between the user and the sound source, recognized according to a preset visualization template such as a radial template, into a visualization object corresponding to the preset visualization template, or outputs the corrected sound source information to the system host.

The display unit 293 matches the corresponding color or intensity of light to the intensity of the recognized sound source, changes the color of the visualized object or the brightness of light according to the intensity of the sound source, and displays the changed color or brightness.

The sound source altitude display unit 295 converts the determined sound source altitude into an angle corresponding to the visualization template and displays the angle, or displays the altitude information of the sound source together with a visualization object obtained by converting the sound source.

Figure 4:
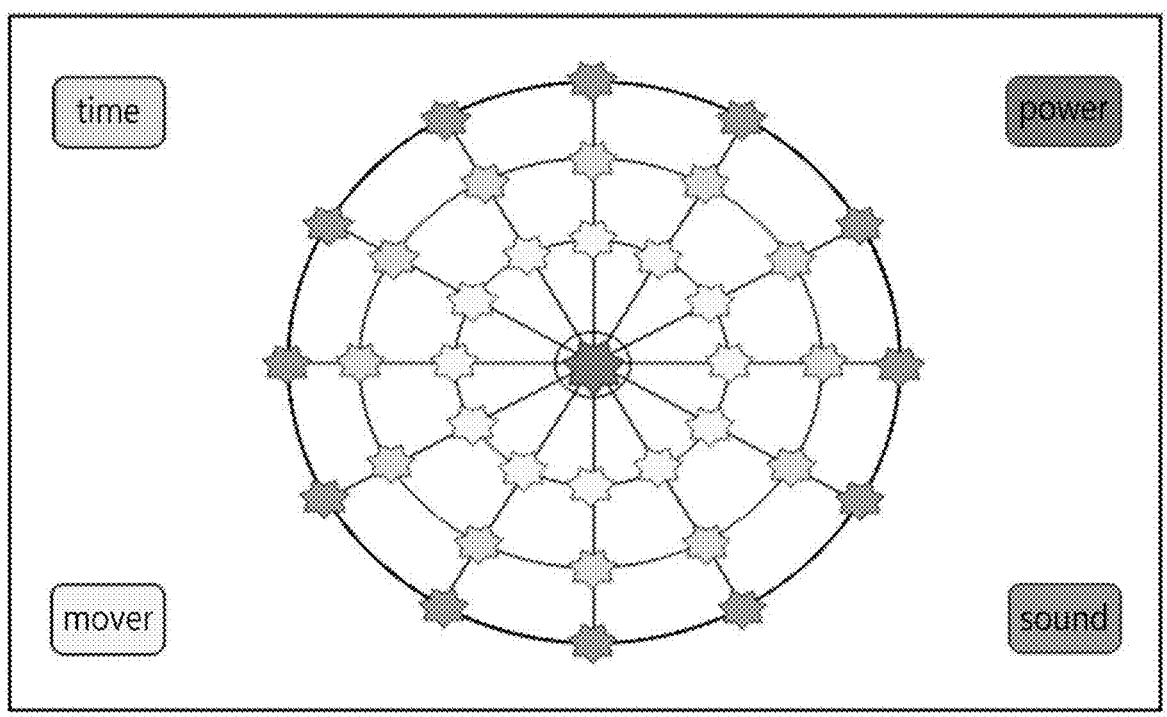
FIG. 4 is a view showing the visualization template of a sound source visualization device according to an embodiment.

FIG. 4 is a view showing the visualization template of a sound source visualization device according to an embodiment.

Referring to FIG. 4, in the embodiment, the sound source visualization template may be configured in a radial shape. The center (C) of the radial template indicates a users location, and the location of the sound source relative to the user's location may be relatively calculated and displayed as visual objects A and B, or the like.

The radial visualization template may convert the direction and distance of the sound source, spaced apart from a user, into a clockwise direction and the diameter of a circle, and may relatively display the direction and distance of the sound source. In addition, in an embodiment, an impact sound, a fricative sound, and a sound source having a specific intensity or higher may be visualized as an impact mark (D), or the intensity of the sound source may be visualized by matching the intensity of the sound source to a color and the flickering frequency of light. In the case where the radial sound source visualization template is used according to the embodiment, in an autonomous vehicle, a nearby sound source signal is converted into a visual form and sound source information is provided to a host system installed in the vehicle or a driver as visual information, so that this allows the driver to become aware of the movement of a nearby object or a nearby situation that cannot be recognized with the camera. In other words, when the sound source visualization method and program according to the embodiment are used for a system or apparatus such as an autonomous vehicle, the location information of a nearby object determined to be a sound source may be output separately from the template provided by the visualization device according to the embodiment. For example, in a system in which a sound source visualization program is installed, information about a nearby object identified through sound source information may be output through a template set in the system, or may be output as voice or visual information.

Furthermore, when the sound source visualization template and sound source visualization device according to the embodiment are installed in a moving assistance apparatus for the elderly, safety-related accidents may be prevented by enabling the elderly with relatively weak hearing to visually recognize auditory information.

Figure 5:
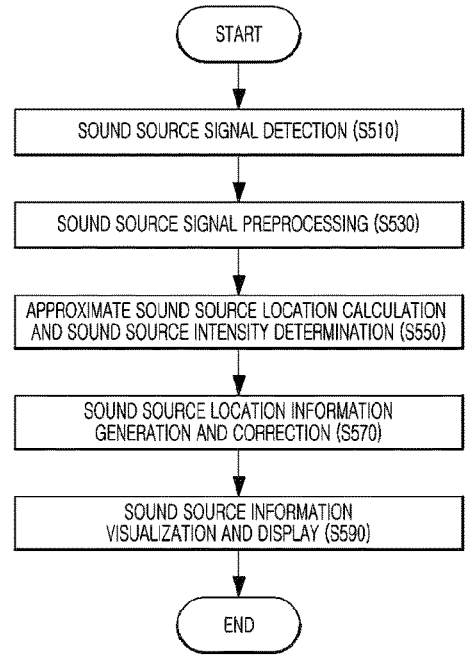
FIG. 5 is a flowchart illustrating a process of visualizing sound source information according to an embodiment.

FIG. 5 is a flowchart illustrating a process of visualizing sound source information according to an embodiment.

Referring to FIG. 5, in step S510, the sound source detection module detects a sound source signal including a surrounding sound, a sound source, and noise by the plurality of sound source detection sensors. In step S530, noise is filtered out from the detected sound source signal by the preprocessing module, and the sound source signal is amplified. In step S550, the calculation module calculates an approximate sound source location including the separation distance from the sound source visualization device, direction, sound intensity, two-dimensional location and altitude information of the sound source by analyzing the preprocessed sound source signal, and determines the intensity of the sound source around a user. In step S570, the search module generates a plurality of pseudo-planes, including altitude information, by using the altitude information of the sound source detected by the individual sound source detection sensors, selects planes from among the plurality of planes, and generates 3D sound source location information by applying the altitude information, obtained using the selected planes, to the approximate sound source location. In step S590, the visualization module converts sound source information, including 3D sound source location information, sound source altitude information, and sound source intensity information, into a visualization signal and displays it.

Figure 6:
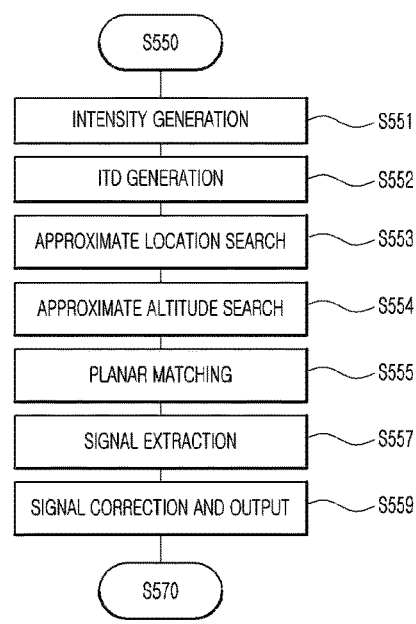
FIG. 6 is a diagram showing in more detail a process of generating and correcting sound source location information according to an embodiment.

FIG. 6 is a diagram showing in more detail a process of generating approximate sound source location information and correcting an extracted signal according to an embodiment.

Referring to FIG. 6, in step S551, the calculation module calculates the intensity of the sound source by combining the signals extracted after the completion of the preprocessing from the individual sensors, and generates an intensity level for each sound source.

In step S552, individual inter-aural time differences (ITDs) are generated using the sound source signals, extracted for the respective sensors, in the calculation module. The sound source time difference (ITD) is an arriving time difference attributable to the difference between paths to two sensors according to the location of the sound source, and is a numerical value that mainly contributes to the perception of the location of the sound source in the horizontal direction. In the embodiment, the individual sensors generate ITDs for the same sound source so that the distance between the sound source and the user can be calculated and the direction of the sound source and the location of the sound source can be more accurately determined.

In step S553, the search module recognizes an approximate location by searching for a direction in the horizontal plane while excluding altitude-related characteristics based on the signals input from four acoustic sensors and assuming the same horizontal plane.

In step S554, the same horizontal plane including the altitude is generated using the location recognized through the location search, and the altitude for the sound source is searched for.

In step S555, planar matching for the individual sensors is achieved using the generated approximate location and approximate altitude, thereby allowing a signal to be extracted. For example, the sound source altitude information for planar matching may be calculated using a mode, a median value, and an average value etc. by generating planar z-coordinates for the individual sensors. In step S557, a signal is extracted by reconstructing the signals of the respective sensors at the locations of the sensors reconstructed due to the planar matching. In step S559, the extracted signal is corrected by the verification and simulation of the extracted data and then the corrected signal is output.

Figure 7:
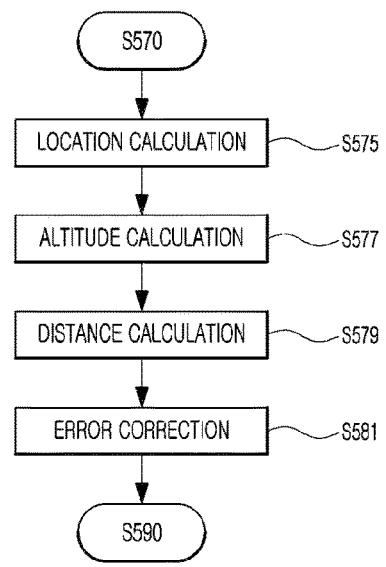
FIG. 7 is a flowchart illustrating in more detail a process of calculating an approximate sound source location and determining the intensity of a sound source according to an embodiment.

FIG. 7 is a flowchart illustrating in more detail a process of generating and correcting sound source location information according to an embodiment.

In step S575, the calculation module calculates the location of the sound source by using the ITDs generated by the individual sensors.

In step S577, the calculation module calculates the altitude of the sound source by using the generated ITDs and the location calculation result in the altitude calculation.

In step S579, the distance between the sound source and a user is calculated using the ITDs generated by the respective sensors and the calculated location and altitude information of the sound source.

In step S581, the calculation module corrects the error of the sound source location information generated in the altitude calculation process of step S577, and corrects the error information between the sound source location and the user generated in the distance calculation process of step S579. After the error correction has been completed, the process enters step S590, in which the sound source information is converted into a visualization object.

Figure 8:
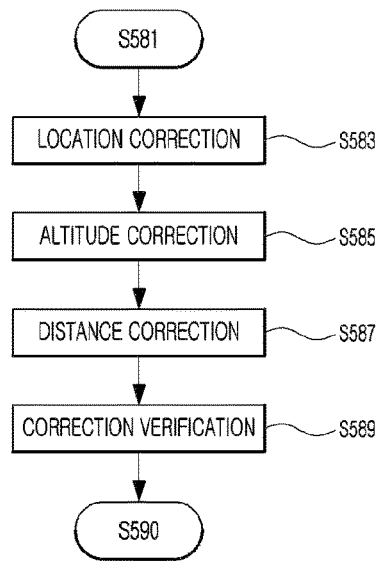
FIG. 8 is a diagram illustrating an error correction process according to an embodiment in more detail.

FIG. 8 is a diagram illustrating an error correction process according to an embodiment in more detail.

Referring to FIG. 8, in step S583, the correction unit corrects the location of the sound source signal, corrected and extracted after the preprocessing in the calculation module, into that of a final signal, and outputs the final signal.

In step S585, the correction unit corrects the altitude calculation result to the location, recognized by the location correction, in altitude correction, and outputs it. In step S587, the correction unit corrects the distance between the user and the sound source by correcting the distance while reflecting the location correction result and the altitude correction result. In step S589, the correction unit finally checks the corrected result and outputs the result.

Figure 9A:
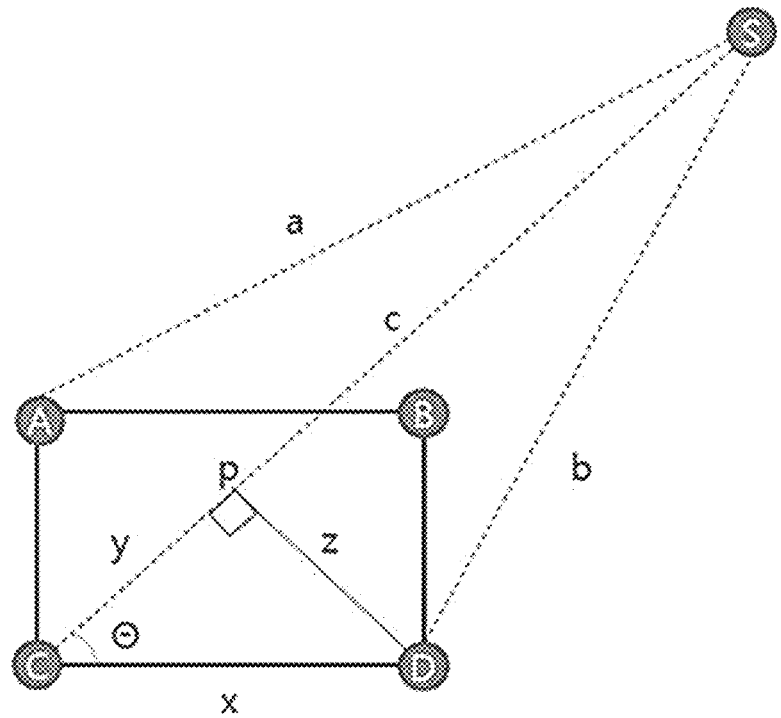
FIG. 9A is a diagram illustrating a process of calculating a distance to a sound source and a location correction calculation process according to an embodiment.

FIG. 9A is a diagram illustrating a process of calculating a distance to a sound source and a location correction calculation process according to an embodiment.

Referring to FIG. 9A, when sound source detection sensors provided in a sound source visualization device according to the embodiment are A, B, C, and D and a sound source is S, the arrival times from the sound source to the individual sensors and the distances between the individual sensors and the sound source are all measured differently. When the speed of sound is calculated as 340 m/s, the distances a, b, and c between the individual sensors and the sound source may be determined through the differences between the times at which the specific sound source arrives the individual sensors. When the ITD for the sensor D and the sensor C is determined, a distance band the distance between the sound source s and the point p are considered to be the same, and a distance y may be calculated. Since the distance x is a known value, the direction and altitude of the sound source are determined by calculating an angle $\theta$ on the assumption that y and z are perpendicular to each other. A method of calculating the angle $\theta$ shown in FIG. 9 calculates the angle $\theta$ on the assumption that the sound source S is spaced apart by infinity. Accordingly, in an embodiment, the distances between the sound source S and the individual sensors are approximated by calculating y and z through an index such as an ITD to calculate the angle $\theta$, so that the direction and altitude of the sound source may be determined. In addition, in the embodiment, in the sound source altitude and location correction process, the altitude and direction of the sound source may be corrected by re-calculating or resetting y and z and correcting the angle $\theta$.

Figure 9B:
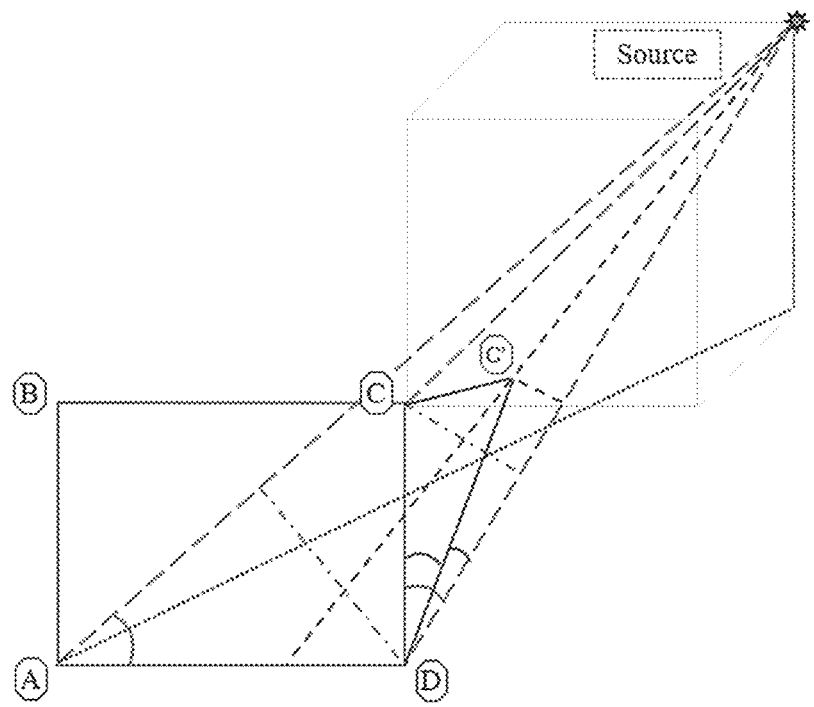
FIG. 9B is a diagram illustrating a method of calculating an approximate sound source location including the separation distance, direction, intensity, two-dimensional location, and altitude information of a sound source in a calculation module according to an embodiment and also illustrating the generation of pseudo-planes.

FIG. 9B is a diagram illustrating a method of calculating an approximate sound source location including the separation distance, direction, intensity, two-dimensional location, and altitude information of a sound source in a calculation module according to an embodiment.

In the calculation module 250 according to the embodiment, the intensity of a sound source may be detected by summing the sound source signals of respective sensors. For example, the calculation module 250 determines the intensity and basic direction of the sound source by summing or comparing the signal outputs of four sensors, and calculates a two-dimensional approximate location, a direction, and a separation distance by using two ITDs, obtained by three sensors selected from among the sensor combinations BDC, DCA, CAB, or ABD of FIG. 9B, in which three of the four sensors form a right angle, based on the calculated intensities of the sound source, by means of a triangulation method. In the embodiment, a movement direction is acquired as a result of comparing sequential locations obtained in the periodic calculation of the generation location. Furthermore, the altitude information of the sound source is simply calculated by comparing the distance calculated by an ITD obtained from two sensors installed diagonally in the combination of sensors and the diagonal distance given by the module.

In addition, in the embodiment, the search module may acquire the altitude information of the sound source as follows. As described above, the search module also determines the intensity and basic direction of the sound source by summing or comparing the signal outputs of the four sensors, and calculates a two-dimensional approximate generation location, a direction, and a separation distance by using two ITDs, obtained from three sensors selected from among sensor combinations BDC, DCA, CAB, and ABD, in which three of the four sensors form a right angle, by means of a triangulation method. In this case, a movement direction is acquired as a result of comparing sequential locations obtained in the periodic calculation of the generation location. Furthermore, the altitude information of the sound source may be simply calculated by comparing the distance calculated by an ITD obtained from two sensors installed diagonally in the combination of sensors and the diagonal distance given in the module. Thereafter, the search module generates a plurality of pseudo-planes, selects some planes from among the plurality of generated pseudo-planes, and acquires altitude information using the selected planes. As shown in FIG. 9B, in the embodiment, a plane composed of ADC' from three sensors ADC is assumed, and altitude information and position information acquired using the selected plane are generated.

Figure 10:
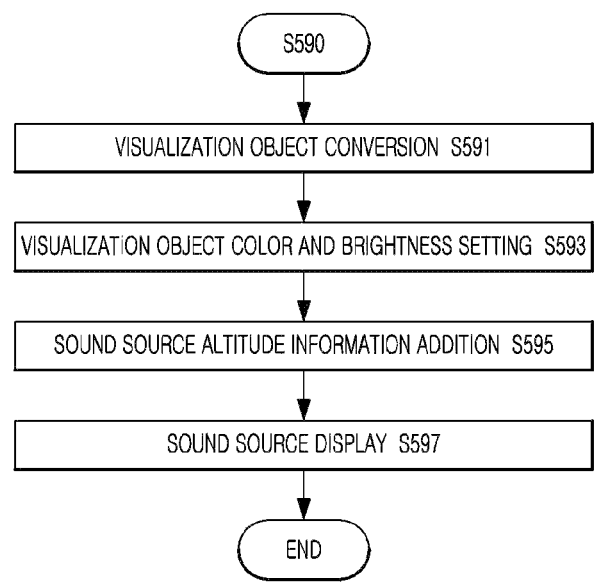
FIG. 10 is a flowchart illustrating a sound source information visualization process according to an embodiment.

FIG. 10 is a flowchart illustrating a sound source information visualization process according to an embodiment.

In step S591, the direction of the recognized sound source and the separation distance between the user and the sound source are converted into a visualization object corresponding to a preset radial visualization template according to the preset radial visualization template.

In step S593, a corresponding color or intensity of light is matched to the recognized intensity of the sound source, and the color or the brightness of light of the visualized object is changed according to the intensity of the sound source and is then displayed.

In step S595, the corrected altitude information of the sound source is displayed together with a visualization object into which the sound source is converted. In embodiments, not only LEDs but also LCDs and OLEDs may be used for the display device.

The above-described sound source visualization device and method may determine various types of sound source information including the altitude, location, and intensity of a sound source, so that whether an object is present around a user and a danger signal may be more accurately identified through the sound source. Furthermore, pseudo-planes each including a sound source location in three dimensions for respective sound source detection sensors are generated and sound source altitude information is corrected by planar matching, so that even the sound source altitude information can be accurately provided to a user even when a sound source is not present on a plane.

In addition, when the sound source visualization device according to the embodiment is provided to a user and the elderly with weak hearing, a sound source signal is visualized and then a nearby object and sound source information are provided, so that visualized auditory information may be rapidly determined. Furthermore, the sound source visualization process may be applied to an autonomous vehicle and used to identify an object around the vehicle.

The disclosure is merely examples and may be variously changed and implemented by those of ordinary skill in the art without departing from the gist of the claims requested in the claims, so that the range of protection of the disclosure is not limited to the specific embodiments described above.

INDUSTRIAL APPLICABILITY

In an autonomous vehicle, a nearby sound signal is converted into a visual form and sound source information is provided to a system or a driver as visual information, so that the system or the driver can identify an emergency situation attributable to the movement of a nearby object or a nearby sound that cannot be visually recognized or cannot be recognized with a camera.

In addition, pseudo planes representing the locations of a sound source in three dimensions for respective sound sensors are generated and sound source altitude information is corrected through the planar matching of the planes, so that even the sound source altitude information can be accurately provided to a user even when a sound source is not present on a plane. When the sound source visualization device according to the embodiment is provided to a user and the elderly with weak hearing, those with weak hearing may visually recognize a sound source signal. When the sound source visualization device according to the embodiment is installed in moving assistance apparatus for the elderly, safety-related accidents may be prevented by enabling elderly people with relatively weak hearing to visually recognize auditory information.

The invention claimed is:

1. A sound source visualization device comprising:
a sound source detection module configured to detect a sound source signal, including a surrounding sound; a sound source, and noise, by using four sound source detection sensors, wherein the four sound source detection sensors are arranged at vertices of a specific rectangle respectively, and at least one of the four sound source detection sensors is installed at a different height from the rest of the four sound source detection sensors;
a preprocessing module configured to filter out the noise from the detected sound source signal, and amplify the sound source signal;
a calculation module configured to calculate an approximate sound source location, including a separation distance from the sound source visualization device, direction, sound source intensity, and a two-dimensional position of the sound source, by analyzing the preprocessed sound source signal, wherein the separation distance, the direction and the two-dimensional position of the sound source are calculated by using two Interaural Time Differences (ITDs) obtained by three sound source detection sensors forming a right angle among the four sound source detection sensors by means of a triangulation method;
a search module configured to generate a three-dimensional sound source location and altitude information based on an ITD obtained from two sound source sensors installed diagonally at different heights among the three sound source detection sensors forming the right angle; and
a visualization module configured to output sound source information, including the three-dimensional sound source location information, sound source altitude information, and sound source intensity information, to a preset system host or to convert this sound source information into a visualization signal and display the visualized signal.

2. The sound source visualization device of claim 1, wherein the calculation module comprises:
- a sound source intensity calculation unit configured to determine sound source data and an intensity of the sound source signal recognized by the sound source detection sensors, and to calculate a sound source intensity level corresponding to the determined an intensity of the sound source signal; and
- a sound source location calculation unit configured to calculate a location of the sound source and a direction of movement of the sound source by analyzing the sound source detection signal detected by the individual sound source detection sensors and the sound source signal transmitted from the preprocessing module.

3. The sound source visualization device of claim 1, wherein the search module further comprises a correction unit configured to correct the sound source location, the sound source distance, and the sound source altitude.

4. The sound source visualization device of claim 1, wherein the visualization module comprises;
- a conversion unit configured to convert the recognized direction of the sound source and the separation distance between a user and the sound source into a visualization object corresponding to a preset visualization template according to the preset visualization template;
- a sound source intensity display unit configured to match the recognized intensity of the sound source to a corresponding color or intensity of light, to change a color or brightness of light of the visualized object according to the intensity of the sound source, and to display the changed information; and
- a sound source altitude display unit configured to display the corrected altitude information of the sound source together with the visualization object into which the sound source is converted.

5. A sound source visualization method comprising the steps of:
- (A) detecting, by a sound source detection module, a sound source signal, including a surrounding sound, a sound source, and noise, by using four sound source detection sensors, wherein the four sound source detection sensors are arranged at vertices of a specific rectangle respectively, and at least one of the four sound source detection sensors is installed at a different height from the rest of the four sound source detection sensors;
- (B) filtering out, by a preprocessing module, the noise from the detected sound source signal, and amplifying, by the preprocessing module, the sound source signal;
- (C) calculating, by a calculation module; an approximate sound source location, including a separation distance from a sound source visualization device, direction, sound source intensity, and a two-dimensional position of the sound source, by analyzing the preprocessed sound source signal, wherein the separation distance, the direction and the two-dimensional position of the sound source are calculated by using two Interaural Time Differences (ITDs) obtained by three sound source detection sensors forming a right angle among the four sound source detection sensors by means of a triangulation method;
- (D) generating, by a search module, three-dimensional sound source location information based on an ITD obtained from two sensors installed diagonally at different heights among the three sound source detection sensors forming the right angle; and
- (E) converting, by a visualization module, sound source information, including the three-dimensional sound source location information, sound source altitude information, and sound source intensity information, into a visualization signal, and displaying, by the visualization module, the visualized signal.

6. The sound source visualization method of claim 5, wherein the step (C) comprises:
- determining sound source data and an intensity of sound source signal recognized by the sound source detection sensors, and calculating a sound source intensity level corresponding to the determined intensity of the sound source signal; and
- calculating a location of the sound source and direction of movement of the sound source by analyzing the sound source detection signal detected by the individual sound source detection sensors and the sound source signal transmitted from the preprocessing module.

7. The sound source visualization method of claim 5, wherein the step (D) further comprises:
- correcting the approximate sound source location information using the extracted sound source altitude information, and correcting the sound source location, the sound source distance, the intensity, and the sound source altitude.

8. The sound source visualization method of claim 5, wherein the step (E) further comprises:
- converting the recognized direction of the sound source and the separation distance between a user and the sound source into a visualization object corresponding to a preset visualization template according to the preset visualization template;
- matching the recognized intensity of the sound source to a corresponding color or intensity of light, and changing a color or a brightness of light of the visualized object according to the intensity of the sound source; and
- displaying the corrected altitude information of the sound source together with the visualization object into which the sound source is converted.

9. The sound source visualization method of claim 8, wherein the step (E) further comprises:
- outputting the corrected altitude information of the sound source together with the visualization object, into which the sound source is converted, in a system in which a sound source visualization program is installed.

* * * * *